US012743688B2

(12) United States Patent
Rizzo et al.

(10) Patent No.: US 12,743,688 B2
(45) Date of Patent: Sep. 22, 2026

(54) NEAR-FIELD COMMUNICATION DEVICE

(71) Applicants: STMicroelectronics (Rousset) SAS, Rousset (FR); STMicroelectronics (China) Investment Co., Ltd., Shanghai (CN)

(72) Inventors: Pierre Rizzo, Trets (FR); Laurent Tricheur, Shanghai (CN)

(73) Assignees: STMicroelectronics (Rousset) SAS, Rousset (FR); STMicroelectronics (China) Investment Co., Ltd., Shanghai (CN)

( * ) Notice: Subject to any disclaimer, the term of this patent is extended or adjusted under 35 U.S.C. 154(b) by 366 days.

(21) Appl. No.: 18/242,980

(22) Filed: Sep. 6, 2023

(65) Prior Publication Data

US 2024/0086891 A1 Mar. 14, 2024

(30) Foreign Application Priority Data

Sep. 8, 2022 (FR) ....................................... 2208971

(51) Int. Cl.
*G06Q 20/32* (2012.01)
*H04B 5/72* (2024.01)

(52) U.S. Cl.
CPC ........... *G06Q 20/3278* (2013.01); *H04B 5/72* (2024.01)

(58) Field of Classification Search
CPC .. G06Q 20/32; G06Q 20/3278; G06Q 20/352; G06Q 20/326; G06Q 20/353; H04L 63/18; H04W 4/80; H04B 5/00; H04B 5/0031; H04B 5/72
See application file for complete search history.

(56) References Cited

U.S. PATENT DOCUMENTS 11,012,118 B2 * 5/2021 Tramoni .................. H04B 5/79
11,468,428 B1 * 10/2022 Rule .................. G06Q 20/3226
2019/0303917 A1 10/2019 Locke et al.

OTHER PUBLICATIONS

INPI Search Report and Written Opinion for priority application, FR 2208971, report dated Jan. 26, 2023, 8 pgs.

* cited by examiner

*Primary Examiner* — Tuan H Nguyen
(74) *Attorney, Agent, or Firm* — Crowe & Dunlevy LLC

(57) ABSTRACT

A first near-field communication device detects the presence of a second near-field communication device located within range. In response to that detection, there is an initiation of a near-field communication between the first and second devices. In case of a failure of the initiation of the near-field communication, instead an initiation of a contactless bank transaction between the first and second devices occurs.

7 Claims, 2 Drawing Sheets

301
NFC SERVICE ON

303
NFC FORUM STACK

305
NFC FORUM TAG?

yes no

307
EMVCO STACK

309
ANSWER TO SELECT PPSE?

no yes

311
ACTIVATE POS APPS UI

313
PROCEED OR CANCEL PAYMENT

300

NEAR-FIELD COMMUNICATION DEVICE

PRIORITY CLAIM

This application claims the priority benefit of French Application for Patent No. 2208971, filed on Sep. 8, 2022, the content of which is hereby incorporated by reference in its entirety to the maximum extent allowable by law.

TECHNICAL FIELD

The present disclosure generally concerns electronic devices. The present disclosure more particularly concerns electronic devices integrating a near-field communication (NFC) circuit, more commonly called NFC devices, as well as contactless bank transactions implemented by such devices.

BACKGROUND

Current NFC devices may implement, in addition to near-field data and energy (charge) exchanges, contactless bank transactions with other NFC devices. Conversely to near-field data and energy exchanges, which are generally initiated by an NFC device as soon as another NFC device is detected within range, contactless bank transactions between NFC devices require an action from a user, for example, the launching of a bank application on one of these devices, so that their execution starts. This makes bank transactions between NFC devices more difficult to use.

There is a need to improve current NFC devices as well as contactless bank transactions implemented by these devices.

There is a need to overcome all or part of the disadvantages of known NFC devices and of known contactless bank transactions between these devices.

SUMMARY

In an embodiment, a method comprises the following steps: a) detecting, by a first near-field communication device, the presence of a second near-field communication device located within range; b) initiating a near-field communication between the first and second devices; and c) in case of a failure of the initiation of the near-field communication, initiating a contactless bank transaction between the first and second devices.

According to an embodiment, the contactless bank transaction is initiated before the end of an execution of a method of near-field communication between the first and second devices.

According to an embodiment, the contactless bank transaction is initiated after the end of an execution of a method of near-field communication between the first and second devices.

According to an embodiment, at step c), the bank transaction comprises a contactless payment.

According to an embodiment, the first device is a cell phone.

According to an embodiment, the second device is an IC card, preferably a contactless payment card.

According to an embodiment, the contactless payment card complies with the ISO/IEC 14443-4 standard.

According to an embodiment, the second device is a cell phone or a portable communicating object emulating an IC card, preferably a contactless payment card.

According to an embodiment, at step b), the near-field communication is performed according to the NFC Forum specifications.

An embodiment provides a near-field communication device comprising an integrated circuit configured to implement the method such as described.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the generation of the radio frequency signals and their interpretation have not been detailed, the described embodiments and implementation modes being compatible with usual techniques for generating and interpreting these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms “front”, “back”, “top”, “bottom”, “left”, “right”, etc., or relative positions, such as terms “above”, “under”, “upper”, “lower”, etc., or to terms qualifying directions, such as terms “horizontal”, “vertical”, etc., it is referred, unless specified otherwise, to the orientation of the drawings.

Unless specified otherwise, the expressions “about”, “approximately”, “substantially”, and “in the order of” signify plus or minus 10%, preferably of plus or minus 5%.

Figures 1, 2, 3:
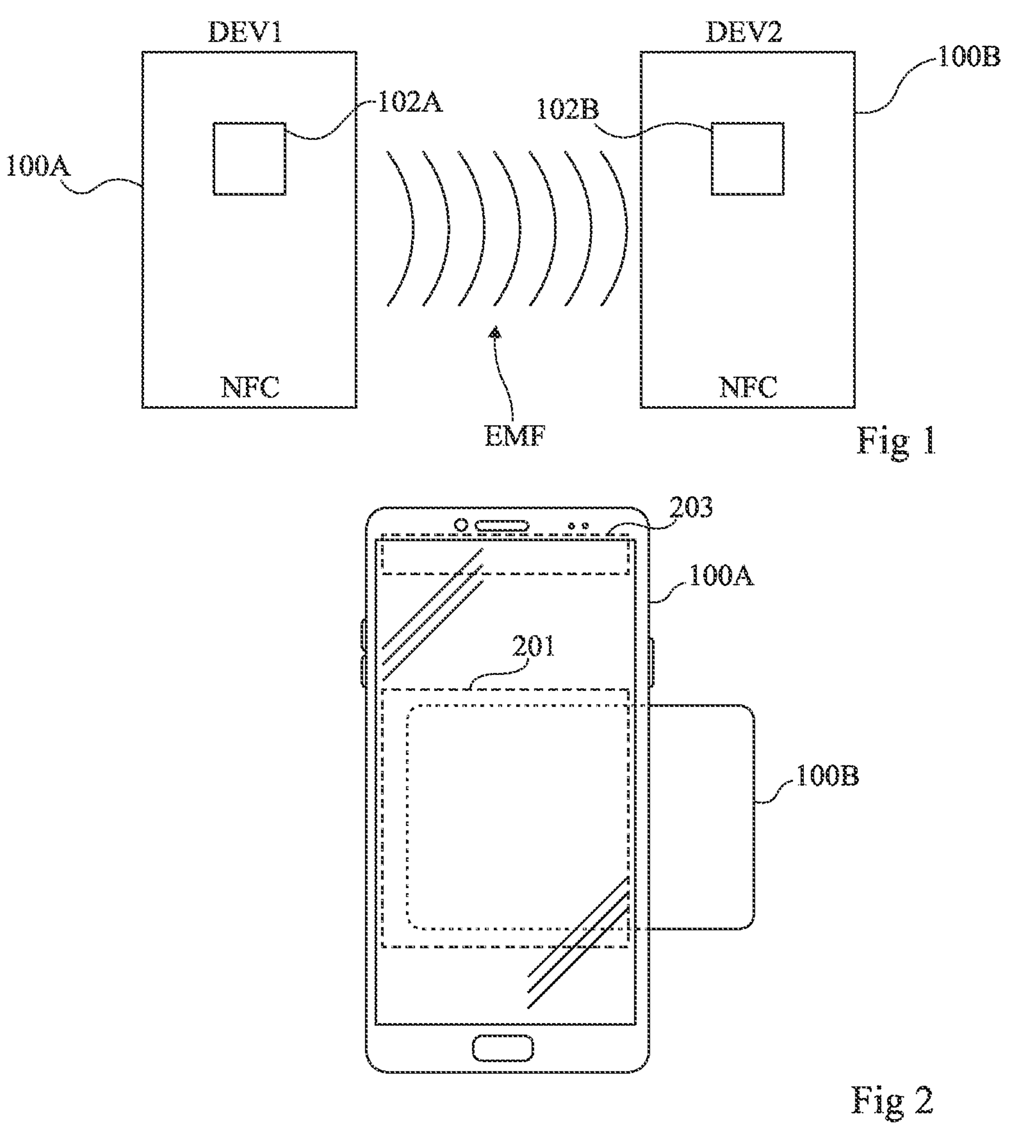
FIG. 1 schematically shows in the form of blocks an example of a near-field communication system of the type to which described embodiments and implementation modes apply as an example.
FIG. 2 shows an IC card located in the vicinity of a cell phone.
FIG. 3 is a flowchart illustrating a method comprising near-field communication steps and contactless bank transaction steps according to an implementation mode.

FIG. 1 schematically shows in the form of blocks an example of a near-field communication system of the type to which described embodiments and implementation modes apply as an example.

FIG. 1 very schematically illustrates the case of two similar electronic devices, for example, two cell phones, but what is described more generally applies to any system where a reader or a terminal radiates an electromagnetic field likely to be captured by a transponder, for example, an electronic tag, a microcircuit card ("IC card"), a more sophisticated device (for example, a telephone), etc. For simplification, reference made herein to NFC devices will be understood to designate devices integrating at least one near-field communication (NFC) circuit.

In the shown example, a first NFC device 100A (DEV1) is likely to communicate, by near-field electromagnetic coupling, with a second NFC device 100B (DEV2). According to the applications, for a communication, one of the NFC devices 100A, 100B operates in so-called reader mode while the other NFC device 100B, 100A operates in so-called card emulation mode, or the two NFC devices 100A and 100B communicate in so-called peer-to-peer (P2P) mode.

Each NFC device 100A, 100B integrates a near-field communication circuit symbolized, in FIG. 1, by a block 102A, 102B. Near-field communication circuits 102A and 102B each comprise various electronic elements or circuits for generating or detecting a radio frequency signal by means of an antenna (not shown), for example, modulation or demodulation circuits. During a communication between NFC devices 100A and 100B, the radio frequency signal generated by one of NFC devices 100A, 100B is captured by the other NFC device 100B, 100A located within range.

In FIG. 1, it is arbitrarily assumed that the first NFC 100A device emits an electromagnetic field (EMF) captured by the second NFC device 100B within range. A coupling then forms between two oscillating circuits, in the case in point that of the antenna of first NFC device 100A and that of the antenna of second NFC device 100B. This coupling translates as a variation of the load formed by the circuits of NFC device 100B on the oscillating circuit for generating the EMF field of NFC device 100A.

In practice, to establish a communication, a phase or amplitude variation of the emitted field is detected by device 100A, which then starts an NFC communication protocol with device 100B. On the side of NFC device 100A, it is in practice detected whether the amplitude of the voltage across the oscillating circuit and/or the phase shift with respect to the signal generated by circuit 102A come out of amplitude and/or phase ranges (or windows) each delimited by thresholds.

Once NFC device 100A has detected the presence of NFC device 100B in its field, it starts a procedure for establishing a communication implementing the sending of requests by NFC device 100A and of answers by NFC device 100B (polling sequence such as defined in the NFC Forum technical specifications). The circuits of NFC device 100B, if they were in standby mode, are then reactivated.

When an NFC device is not communicating, it may be switched to low-power mode, or standby mode, to decrease the consumed energy. This is particularly the case for battery-powered NFC devices. In the low-power mode, an NFC device configured in reader mode executes a so-called card detection mode ("Low Power Card Detection"—LPCD) also called tag detection mode ("Low Power Tag Detection"—LPTD), where it executes loops for detecting another device located in its field (within range) to come out of a standby mode for communication purposes.

The detection is similar to that performed when the device is not in low-power mode. However, in normal mode, the emission of the carrier (of the field) is continuous and periodically includes polling frames while, in standby mode, the emission of the field is performed in periodic bursts, and with no polling frame to decrease the power consumption. The bursts have a duration much shorter (by a ratio of at least ten, preferably of at least one hundred) than the duration of a polling request of a card in normal mode.

Applications aim, for example, at taking advantage of the EMF field to implement data exchanges between NFC devices 100A and 100B.

Other applications rather aim, for example, at taking advantage of the EMF field to implement energy exchanges between NFC devices 100A and 100B. Generally, this corresponds, for example, to a case where device 100B has an electrical energy source (not shown), for example, a battery, likely to be charged by NFC device 100A. This more precisely corresponds, for example, to a case where NFC device 100A is a mobile terminal, for example, a cell phone or a touch pad, and where NFC device 100B is a connected object, for example, a connected watch, a connected bracelet, a pair of wireless headphones, a digital pen, etc. In this case, NFC device 100A has, for example, a battery with a greater capacity than that of NFC device 100B.

Other applications further aim, for example, at taking advantage of the EMF field to implement contactless bank transactions between NFC devices. This corresponds, for example, to a case where NFC device 100A is a mobile terminal, for example, a cell phone, and where NFC device 100B is an IC card.

All the above applications may be implemented in turn by a same NFC device. A cell phone may, for example, according to the case of use, exchange data in near field with another phone, charge in near field a battery of a connected watch or perform a bank transaction with a contactless payment card.

FIG. 2 shows a case where NFC device 100A is a cell phone, for example, a smart cell phone or smartphone, and where NFC device 100B is an IC card, for example, a contactless bank payment card, located within range of NFC device 100A.

In the shown example, IC card 100B is arranged in front of a near-field communication antenna 201 of cell phone 100A, for example, an antenna substantially centered with respect to a back side of cell phone 100A. As an example, the antenna 201 of phone 100A is intended for the near-field charge of other NFC devices. In the example illustrated in FIG. 2, the upper surface of card 100B is placed into contact with the back side of phone 100A. Card 100B is for example centered with respect to the back side of phone 100A, to allow an optimal coupling between antenna 201 and an antenna (not shown) of card 100B.

As a variant, card 100B may be placed in front of another near-field communication antenna 203 of phone 100A, for example, an antenna located in the upper portion of phone 100A. As an example, the antenna 203 of phone 100A is intended for data exchanges with other NFC devices. The upper surface of card 100B is then for example placed into contact with the top of the back side of phone 100A, to allow an optimal coupling between the antenna 203 of phone 100A and the antenna of card 100B.

In practice, when payment card 100B is brought towards phone 100A, phone 100A for example detects the presence of card 100B and activates circuit 102A to initiate a near-field communication with card 100B. However, in the case illustrated in FIG. 2 where card 100B is a contactless payment card, card 100B is not automatically recognized by phone 100A. As an example, additional action is required from a user of phone 100A, for example, the launching of a payment application on phone 100A, so that a contactless bank transaction can be initiated between phone 100A and card 100B. This makes the use of phone 100A and of card 100B little intuitive and uneasy to use for the user.

FIG. 3 is a flowchart illustrating a method 300 comprising near-field communication steps and contactless bank transaction steps according to an implementation mode. The method of FIG. 3 is, for example, implemented by the NFC devices 100A and 100B of FIG. 1.

The method illustrated in FIG. 3 comprises a step 301 (NFC SERVICE ON) of activation of the near-field communication circuit 102A of NFC device 100A, for example after a detection of NFC device 100B within range as previously discussed in relation with FIG. 1. This more precisely corresponds, for example, to a situation where NFC device 100B is brought towards the antenna of NFC device 100A. The presence of NFC device 100B within range of NFC device 100A is then detected by the near-field communication circuit 102A of NFC device 100A.

During another step 303 (NFC FORUM STACK) subsequent to step 301, a near-field communication between NFC device 100A and NFC device 100B is initiated by NFC device 100A.

During still another step 305 (NFC FORUM TAG?) subsequent to step 303, NFC device 100A verifies whether the NFC device 100B previously detected within range complies with the NFC Forum technical specifications. If such is the case (output "yes" of block 305), the near-field communication initiated by NFC device 100A for example carries on with exchanges (not detailed) of data frames between NFC devices 100A and 100B. This corresponds, for example, to a case where NFC device 100A is a cell phone and where NFC device 100B is a radio frequency tag. In the shown example, it is returned to step 303 and NFC device 100A is kept in a near-field communication mode.

However, in a case where NFC device 100A detects that NFC device 100B does not comply with the NFC Forum specifications (output "no" of block 305), the near-field communication is considered as having failed. This occurs, for example, when NFC device 100B does not support the NFC Data exchange format (NDEF) such as defined in the NFC Forum specifications. In this case, during still another step 307 (EMVCO STACK) subsequent to step 305, NFC device 100A initiates a contactless bank transaction, for example, a contactless payment, with NFC device 100B.

During still another step 309 (ANSWER TO SELECT PPSE?) subsequent to step 307, NFC device 100A detects whether the NFC device 100B located within range is a contactless payment card. If such is the case (output "yes" of block 309), NFC device 100A launches, during still another step 311 (ACTIVATE POS UI) subsequent to step 309, an application, for example a contactless bank payment application. This corresponds, for example, to the case of FIG. 2, where NFC device 100A is a cell phone and where NFC device 100B is a contactless payment card or a cell phone configured as contactless payment means, for example, a smartphone emulating a contactless payment card. As a variant, NFC device 100B may be selected from any type of portable communicating object such as a smart watch, a connected bracelet, a cell phone, etc. emulating a contactless payment card.

However, if NFC device 100A detects that NFC device 100B is not a contactless payment card (output "no" of block 309), the bank transaction is considered as having failed. In the shown example, it is then returned to step 303 and NFC device 100A is taken back to a near-field communication mode.

In the case where the NFC device 100B previously detected within range is a contactless payment card, the bank transaction is performed during still another step 313 (PROCEED OR CANCEL PAYMENT) subsequent to step 311. More precisely, money is transferred, for example, from an account associated with NFC device 100B to another account associated with NFC device 100A. As a variant, the bank transaction may be canceled, for example, due to an insufficient balance on the account associated with NFC device 100B. In the shown example, it is then returned to step 303 and NFC device 100A is taken back to a near-field communication mode.

Although this has not been illustrated in FIG. 3, it may be provided for the near-field communication circuit of NFC device 100A to be set to standby or deactivated after an inactivity delay. As an example, a switching to the low-power mode may be provided if NFC device 100A remains for several tens of seconds at step 303 without exchanging data or if NFC device 100A detects that NFC device 100B is no longer present within range.

Figures 4, 5:
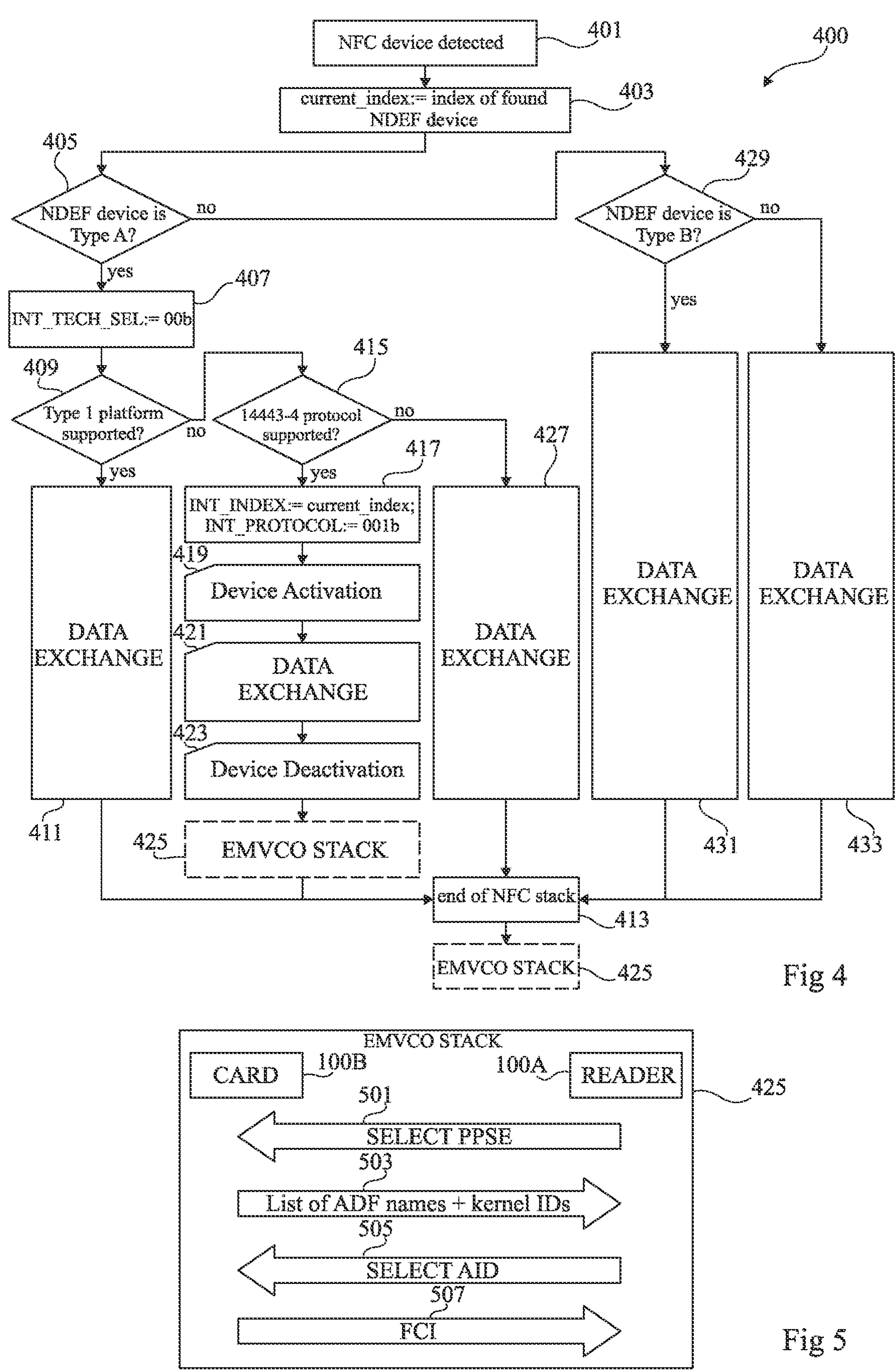
FIG. 4 is a flowchart illustrating a method comprising near-field communication steps according to an implementation mode.
FIG. 5 is a flowchart illustrating a method comprising contactless bank transaction steps according to an implementation mode.

FIG. 4 is a flowchart illustrating a method 400 comprising near-field communication steps according to an implementation mode. More precisely, FIG. 4 illustrates in more detailed fashion examples of steps corresponding, for example, to the steps 301, 303, 305, and 307 previously discussed in relation with FIG. 3.

During a step 401 (NFC device detected), a first near-field communication device, for example NFC device 100A, detects the presence of a second near-field communication device, for example NFC device 100B, located within range.

During another step 403 (current index:=index of found NDEF device) subsequent to step 401, an indicator associated with NFC device 100B is assigned to a variable noted current_index.

During still another step 405 (NDEF device is Type A?) subsequent to step 403, NFC device 100A detects whether NFC device 100B is a type-A NFC device, that is, a device complying with the ISO/IEC 14443A standard. If such is the case (output "yes" of block 405), NFC device 100A then assigns a hexadecimal value 00b to a variable INT_TECH_SEL during still another step 407 (INT_TECH_SEL:=00b) subsequent to step 405.

During still another step 409 (Type 1 Platform supported?) subsequent to step 407, NFC device 100A detects whether NFC device 100B is a type-1 NFC device. If such is the case (output "yes" of block 409), steps of near-field communication between NFC device 100A and NFC device 100B are then implemented. These steps, which may comprise, for example, data frame exchange operations, are symbolized in FIG. 4 by a single functional block 411 (DATA EXCHANGE).

During still another step 413 (end of NFC stack) subsequent to step 411, the near-field communication between NFC devices 100A and 100B ends.

In a case where, during step 409, NFC device 100A determines that NFC device 100B is not of type 1 (output "no" of block 409), NFC device 100A then detects, during still another step 415 (14443-4 protocol supported?) subsequent to step 409, whether NFC device 100B supports the communication protocol defined by the ISO/IEC 14443-4 standard. If such is the case (output "yes" of block 415), NFC device 100A then assigns the value of variable current_index to a variable INT_INDEX during still another step 417 (INT_INDEX:=current_index; INT_PROTOCOL:=001b) subsequent to step 415. Further, NFC device 100A assigns a hexadecimal value 001b to a variable INT_PROTOCOL during step 417.

During still another step 419 (Device Activation) subsequent to step 417, NFC device 100A is activated to initiate a data exchange with NFC device 100B.

During still another step 421 (DATA EXCHANGE) subsequent to step 419, data may be exchanged between NFC devices 100A and 100B. This corresponds, for example, to a case where NFC devices 100A and 100B are respectively a telephone and a radio frequency tag. In a case where NFC device 100B is a contactless payment card, NFC device 100B is not, for example, recognized by NFC device 100A during step 421.

During still another step 423 (Device Deactivation) subsequent to step 421, NFC device 100A is deactivated to enable to end the data exchange with NFC device 100B or to exit from the data exchange mode in a case where NFC device 100B is not recognized by NFC device 100A.

During still another step 425 (EMVCO STACK) subsequent to step 423, NFC device 100A initiates a contactless bank transaction with NFC device 100B. This corresponds, for example, to the case where NFC device 100B is a contactless payment card not recognized by NFC device 100A during step 423. In this case, the contactless bank transaction is thus initiated before the end of the execution of the method of near-field communication between NFC devices 100A and 100B.

In a case where, during step 415, NFC device 100A detects that NFC device 100B does not support the communication protocol defined by the ISO/IEC 14443-4 standard (output "no" of block 415), steps of near-field communication between NFC devices 100A and 100B are then implemented. These steps, which may comprise, for example, data frame exchange operations, are symbolized in FIG. 4 by a single functional block 427 (DATA EXCHANGE). In this case, NFC device 100A considers, for example, that NFC device 100B is a type-2 NFC device.

Once the data exchanges are over, the near-field communication ends at step 413.

In a case where, during step 405, NFC device 100A detects that NFC device 100B is not of type A (output "no" of block 405), NFC device 100A detects whether NFC device 100B is a type-B NFC device, that is, a device complying with the ISO/IEC 14443B standard. If such is the case (output "yes" of block 429), steps of near-field communication between NFC devices 100A and 100B are then implemented. There steps are symbolized in FIG. 4 by a single functional block 431 (DATA EXCHANGE).

Once the data exchanges are over, the near-field communication ends at step 413.

In a case where, during step 429, NFC device 100A detects that NFC device 100B is not of type A (output "no" of block 429), NFC device 100A estimates that NFC device 100B is a type-F NFC device, that is, a device complying with the FeliCa JIS X6319-4 standard. Steps of near-field communication between NFC devices 100A and 100B are then implemented. These steps are symbolized in FIG. 4 by a single functional block 433 (DATA EXCHANGE).

Once the data exchanges are over, the near-field communication ends at step 413.

As a variant, step 425 of initiation of the bank transaction by NFC device 100A may be implemented subsequently to step 413. In this case, the contactless bank transaction is initiated after the end of the execution of the method of near-field communication between NFC devices 100A and 100B.

FIG. 5 is a flowchart illustrating a method comprising steps of contactless bank transaction according to an implementation mode. More precisely, FIG. 5 illustrates in more detailed fashion examples of operations executed, for example, by NFC devices 100A and 100B during step 425 (EMVCO STACK). It is arbitrarily assumed that NFC devices 100A and 100B are respectively a cell phone and a contactless payment card.

In the shown example, the NFC device 100A (READER) configured in reader mode transmits, to the NFC device 100B (CARD) configured in card emulation mode, a request (arrow 501, SELECT PPSE) aiming at activating a proximity payment system environment (PPSE). This request enables, for example, to obtain, due to a single command, marks and applications available on NFC device 100B and to make a choice according to a priority and an availability of operating system software, or kernel, capable of being executed by NFC device 100B.

As an answer (arrow 503, List of ADF names+kernel IDs), NFC device 100B transmits to NFC device 100A one or a plurality of data elements relative, for example, to a list of products supported by NFC device 100B, to the kernels executable by NFC device 100B, and to priority levels of these kernels with respect to one another. As an example, these data are so-called file control information data (FCI).

NFC device 100A then processes the data transmitted by NFC device 100B, for example to compare names of application definition files (ADF) and identifiers of kernels with respect to a set of combinations of application identifiers (AID) and of kernels specific to the types of applications that NFC device 100A is capable of supporting for a given type of transaction. This results, for example, in a list of combinations, classified by priority order or, for equal priority matches, by order in the list of file control information data.

As an answer (arrow 505, SELECT AID), NFC device 100A selects the combination having the highest priority and transmits the application identifier of this combination to NFC device 100B. The identifier then is processed, for example, by the kernel of NFC device 100B.

During still another step (arrow 507, FCI), NFC device 100B transmits, for example, to NFC device 100A file control information data.

Although this has not been detailed in FIG. 5, other operations linked to the contactless bank transaction between NFC devices 100A and 100B may then be executed. As an example, a bank application may be launched on NFC device 100A, with no action from a user of this device, to perform a contactless payment.

Generally, the implementation of step 425 complies, for example, with the "EMV Contactless Specifications for Payment Systems" specification.

An advantage of the methods described hereabove in relation with FIGS. 3 to 5 lies in the fact that they enable to initiate a contactless bank transaction between NFC devices 100A and 100B is case of failure of a near-field communication initiated by NFC device 100A. This particularly enables to decrease the number of actions required from the operator.

Various embodiments and variants have been described. Those skilled in the art will understand that certain features of these various embodiments and variants may be combined, and other variants will occur to those skilled in the art. In particular, although examples of application to bank transactions between a cell phone and a contactless payment card have been described hereabove, the described embodiments and implementation modes apply to any types of NFC devices capable of implementing a contactless bank transaction.

Finally, the practical implementation of the described embodiments and variants is within the abilities of those skilled in the art based on the functional indications given hereabove. In particular, the practical implementation of the contactless bank transaction between NFC devices 100A and 100B, for example resulting in a money transfer from a bank account associated with NFC device 100B to another bank account associated with NFC device 100A, is within the abilities of those skilled in the art based on the above indications.

The invention claimed is:

1. A method, comprising:

a) activating, by a first near-field communication device, a first near-field communication circuit in response to detecting that a second near-field communication device is located within range;

b) initiating a near-field communication between the first and second near-field communication devices;

c) verifying, by the first near-field communication device, that the second near-field communication device complies with a certain near-field communication technical specification;

d) where the second near-field communication device does comply with the certain near-field communication technical specification device, exchanging data frames for a near-field communication between the first and second near-field communication devices; and e) where the second near-field communication device does not comply with the certain near-field communication technical specification device:

e1) initiating, by the first near-field communication device, a contactless bank transaction between the first and second near-field communication devices;

e2) detecting, by the first near-field communication device, whether the second near-field communication device is a contactless payment device;

e3) where the second near-field communication device is not a contactless payment device, returning to step b);

e4) where the second near-field communication device is a contactless payment device, launching, by the first near-field communication device, a contactless bank payment application; and e5) executing a bank transaction through the contactless bank payment application.

2. The method of claim 1, wherein the certain near-field communication technical specification specifies use of a certain near-field communication data exchange format.

3. The method of claim 1, where the contactless payment device comprises one of a contactless payment card or a phone supporting a contactless payment system.

4. The method of claim 3, wherein the phone supporting the contactless payment system comprises a smartphone emulating a contactless payment card.

5. The method of claim 1, further comprising, after step e5), returning to step b).

6. A near-field communication device, comprising an integrated circuit configured to implement the method according to claim 1.

7. The method of claim 1, wherein:

(i) initiating the near-field communication at step b) comprises initiating a near-field communication according to a near-field communication (NFC) protocol between the first near-field communication device and the second near-field communication device;

(ii) verifying at step c) comprises, during initiation of the NFC protocol, verifying whether the second near-field communication device is compatible with the NFC protocol;

(iii) when the second near-field communication device is compatible with the NFC protocol, step d) comprises continuing the NFC protocol communication and, upon completion of the NFC protocol communication, returning to step a);

(iv) when initiation of the NFC protocol communication fails or when the second near-field communication device is not compatible with the NFC protocol, step e1) comprises initiating a contactless bank transaction according to an EMVCo protocol between the first near-field communication device and the second near-field communication device;

(v) step e2) comprises, during initiation of the EMVCo protocol, verifying whether the second near-field communication device is compatible with the EMVCo protocol;

(vi) when the second near-field communication device is compatible with the EMVCo protocol, steps e4)-e5) comprise activating the contactless bank payment application in the first near-field communication device to execute the contactless bank transaction and, upon completion of the contactless bank transaction, returning to step a); and (vii) when the second near-field communication device is not compatible with the EMVCo protocol, returning to step a).

* * * * *